United States Patent Office 3,469,851
Patented Sept. 30, 1969

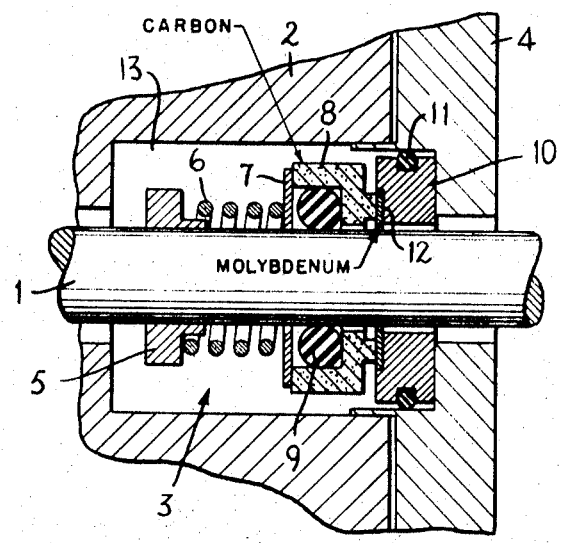

3,469,851
PUMP SHAFT SEAL
Arne F. Enemark, Sonderborg, Denmark, assignor to Danfoss A/S, Nordborg, Denmark, a corporation of Denmark
Filed Sept. 14, 1965, Ser. No. 487,139
Claims priority, application Germany, Sept. 18, 1964, D 45,458
Int. Cl. F16j 15/34, 15/54
U.S. Cl. 277—85      6 Claims

ABSTRACT OF THE DISCLOSURE

A packing box shaft seal in which a resilient ring seal on the shaft is enclosed circumferentially by a carbon cup-shaped ring or sleeve that applies the resilient ring seal radially inwardly circumferentially of the shaft to preclude leakage along the shaft. The carbon ring precludes leakage from the packing box by having an end surface thereof biased against a molybdenum face surface circumferentially of the shaft where it extends out of the stuffing box out of a casing.

---

The present invention relates generally to pumps and more particularly to a new and improved shaft seal for a pump capable of delivering a liquid, for example, an oil pump.

The sealing of a shaft in pumps such as water and oil pumps or in other applications presents relatively difficult problems. In the known shaft seals maintaining fluid tightness, over long periods of time, between the stationary sealing surface of the shaft seal, for example a stationary surface on a casing, and a rotatably driven ring presents a considerable problem. For example, if the ring seal bears on a stationary surface if increased pressure is applied to the ring to effect a seal, increased wear results and the shaft seal operational life is greatly reduced. On the other hand, if an attempt is made to eliminate this wear by relaxing the pressure applied to the seal ring leakage along the shaft will occur.

The above-mentioned difficulties are particularly encountered in packing box constructions in which a shaft seal is housed and a ring seal effects a seal on a stationary cast iron surface. It has been suggested that other materials, such as ceramics and plastics, should be used for cooperating with seal rings, however, these have never been used in practice.

It is a principal object of the present invention to provide a new and improved shaft seal which effectively seals a rotatably driven shaft for prolonged periods of time and greatly reduces wear and tear on the cooperating stationary and rotating seal elements.

A feature of the shaft seal according to the invention is the provision of cooperating seal surfaces of carbon and molybdenum. The invention takes advantage of the fact that carbon and molybdenum surfaces can effect excellent fluid-tight seals and wear therebetween is greatly reduced. This is particularly true if the medium to be sealed happens to be oil. Moreover, the present invention takes advantage of the fact that molybdenum compounds, for example, molybdenum disulfide when used in a structure as one of two frictionally engaging metal parts will reduce friction wear particularly if a lubricating oil is added. In the instant invention, a carbon or graphite seal ring is employed which cooperates with a sealing surface principally of molybdenum. The carbon ring is substantially a solid lubricant and functions to carry out the above-described reduction-of-wear principles.

Another feature of the invention is the versatility with which the shaft seal constructions can be effected. The molybdenum seal surface can be provided as a surface on a component made completely of molybdenum. However, the invention provides for a relatively inexpensive construction by provision of a relatively thin layer of molybdenum defining the molybdenum seal surface provided on a seal support member which is stationary. In practice it has been found that a layer having a thickness of 0.25 millimeter is sufficient. This layer may be applied by spraying, soldering, electroplating or any other known method.

Other features and advantages of the shaft seal in accordance with the present invention will be better understood as described in the following specification and appended claims, in conjunction with the single drawing consisting of a fragmentary sectional view of an oil pump casing having a packing box provided with a shaft seal in accordance with the invention.

While the present invention will be described as principally applicable to an oil pump, it is to be understood that the shaft seal of the invention is usable for other liquid pumps and sealing of rotatably driven shafts in applications other than pumps.

As illustrated in the drawing, a rotatably driven shaft 1 is housed in an oil pump casing 2 and extends axially through a packing box 3 defined by opposed surfaces of the casing as illustrated in the drawing. One end of the packing box is closed by a casing cover plate 4 removably secured to the casing 2 and provided with an opening through which the shaft extends exteriorly of the pump casing 2. The cover plate 4 is provided with an annulus extending axially into the box 3 functioning to seal and for guide purposes in easily mounting the cover plate. It will be understood that the left end of the shaft extends interiorly of the pump casing. As is generally the case, the packing box is in communication with the interior of the casing through an opening in the casing at an end of the box opposite to the end closed by the cover 4.

The shaft seal according to the invention is mounted internally of the packing box 3. The shaft seal comprises a thrust ring 5 secured to the shaft 1 and provides a fixed seat for a spring 6 having a free end applying a biasing pressure to a pressure ring 7 which constantly biases axially of the shaft a carbon or graphite seal ring 8, which is cup-shaped and circumferentially encloses or houses a resilient O-ring 9 to which it applies radially inward pressure thus providing a seal circumferentially of the shaft 1 to effect a seal later described in detail.

In order to seal the opening in the cover plate 4 to preclude leakage from the packing box through the opening in the cover, other than along the shaft, seal means adjacent this opening are provided circumferentially of the shaft and the opening. For this purpose a stationary, metallic ring support 10 bears against the cover plate 4 and is housed in an annular recess in the cover plate 4 defining one end of the packing box 3. The ring 10 is provided with a peripheral central groove as illustrated in which is received and housed a resilient O-ring 11 which engages the surface circumferentially of the shaft defining the box to effect a seal circumferentially of the shaft and radially spaced therefrom. Thus, a seal is effected by the ring 9 directly on the shaft and the ring 11 seals the end of the packing box 3 from leakage from the interior of the casing and box to the exterior.

The seal support ring 10 is stationary and for this reason is provided with a central opening having substantially a diameter greater than the diameter of the shaft 1. In order to preclude leakage through the opening in the ring support 10 another seal is provided comprising an annular layer 12 of molybdenum fixed on the ring support 10 providing an annular bearing or seal surface engaged by an annular surface defined by an axial projection on the ring 8 to effect a seal as illustrated in the drawing. The layer 12 consists of molybdenum about 0.25 millimeter thick and made as a very strong molybdenum. The spring 6 constantly biases the ring 8 into engagement with the layer 12, thereby effectively making a fluid-tight seal between the contacting surfaces of the ring 8 and layer 12. The parts 5–9 rotate with the shaft while the layer 12 remains stationary with the ring 10, however, excessive wear is eliminated while a positive seal is maintained.

It can be seen that oil which enters the packing box from the interior of the pump casing 2 cannot leak along the shaft 1 because of the O-ring 9 and the O-ring 11 precludes leakage of the oil between the cover 4 and the support ring 10. Moreover, the relatively moving seal surfaces on the ring 8 and layer 12 effect a shaft seal precluding leakage between the rotating and stationary components of the seal.

While a preferred embodiment of the invention has been shown and described, it will be understood that many modifications and changes can be made within the true spirit and scope of the invention.

What I claim and desire to secure by Letters Patent is:

1. In combination with a casing having surfaces defining a packing box in communication with the interior of said casing and a rotatably driven shaft extending axially through said box interiorly of said box, said casing having an opening at one end of said box through which said shaft extends exteriorly of said casing, a shaft seal in said box comprising, a metallic stationary ring circumferentially of said shaft covering said opening, a first resilient seal ring on said stationary ring circumferentially thereof engaging a surface defining said box circumferentially of said shaft radially spaced therefrom and effecting a seal axially of said box to preclude fluid flow from said box in a direction toward said opening, another resilient seal ring interiorly of said box and circumferentially of said shaft to preclude flow of fluid axially along said shaft in a direction toward said opening, a carbon cup-shaped ring in said box enclosing said another seal ring circumferentially and applying pressure radially inwardly to said another seal ring to cause said another seal ring to effect a seal circumferentially of said shaft and rotationally driven by said shaft, means biasing said carbon cup-shaped ring axially in a direction causing it to abut said stationary ring and bias said stationary ring into position covering said opening, said carbon cup-shaped ring having a face surface abutting said stationary ring, and means presenting a face surface on said stationary ring consisting of molybdenum circumferentially of said shaft facing in a direction interiorly of said box and against which said carbon cup-shaped ring face surface abuts.

2. In a shaft seal according to claim 1, in which said first seal ring comprises an O-ring, and said another ring comprises an O-ring.

3. In a shaft seal according to claim 1, in which said means biasing said carbon ring comprises a thrust ring fixed on said shaft, a pressure ring covering a mouth of said cup-shaped ring, and a spring seated on said thrust ring bearing on said pressure ring covering a mouth of said cup-shaped ring.

4. In a shaft seal according to claim 3, in which the first mentioned seal ring comprises an O-ring and said another ring comprises an O-ring.

5. In a shaft seal according to claim 4, in which said casing comprises a removable cover having said opening disposed for removal to provide access to said shaft seal interiorly of said box.

6. In the combination according to claim 1, in which said means presenting a face surface on said stationary ring comprises a layer of molybdenum.

References Cited

UNITED STATES PATENTS

| | | | |
|---|---|---|---|
| 2,297,477 | 9/1942 | Huhn et al. | 277—91 X |
| 2,405,464 | 8/1946 | Storer | 277—91 X |
| 2,644,804 | 7/1953 | Rubin. | |
| 2,686,155 | 8/1954 | Willis et al. | |
| 2,852,097 | 9/1958 | Proctor. | |
| 3,014,742 | 12/1961 | Mayer | 277—85 |
| 3,090,627 | 5/1963 | Tankus | 277—85 |
| 3,155,393 | 11/1964 | Hummer | 277—85 X |

FOREIGN PATENTS

| | | |
|---|---|---|
| 1,241,626 | 8/1960 | France. |
| 633,790 | 2/1962 | Italy. |

LAVERNE D. GEIGER, Primary Examiner

JEFFREY S. MEDNICK, Assistant Examiner

U.S. Cl. X.R.

277—91, 96